United States Patent [19]

Arenson

[11] 3,881,029
[45] Apr. 29, 1975

[54] METHOD OF PROVIDING HAMBURGER PATTIES THAT DO NOT ADHERE TOGETHER WHILE PACKAGED AND THAT CAN BE EASILY SEPARATED

[76] Inventor: Simon Weil Arenson, 6602 Copper Ridge Dr., Baltimore, Md. 21209

[22] Filed: May 8, 1973

[21] Appl. No.: 358,315

Related U.S. Application Data

[63] Continuation-in-part of Ser. No. 299,920, Oct. 24, 1972, abandoned.

[52] U.S. Cl. .................. 426/274; 426/92; 426/198; 426/289; 426/296
[51] Int. Cl. .............................................. A23b 1/00
[58] Field of Search ............ 426/92, 274, 289, 296, 426/303, 307, 398, 121, 130, 198

[56] References Cited
UNITED STATES PATENTS 1,996,392   4/1935   Torrence et al. ............... 426/398 X
2,927,029   3/1960   Long ................................... 426/121
3,177,081   4/1965   Kleinschmidt et al. ............. 426/289
3,453,120   7/1969   Olson et al. .......................... 426/92

*Primary Examiner*—Hyman Lord
*Attorney, Agent, or Firm*—Pollock, Philpitt & Vande Sande

[57] ABSTRACT

A method and means of providing hamburger patties that do not adhere together wherein there is used a composition of matter consisting of fat materials in powdered form applied to each side in a new and novel manner.

This invention relates to the production of hamburger patties and particularly to the composition of matter providing hamburger patties that do not adhere together during the time they are refrigerated or when they are frozen and also to the method of applying the material in a uniform manner to hamburger patties.

6 Claims, 4 Drawing Figures

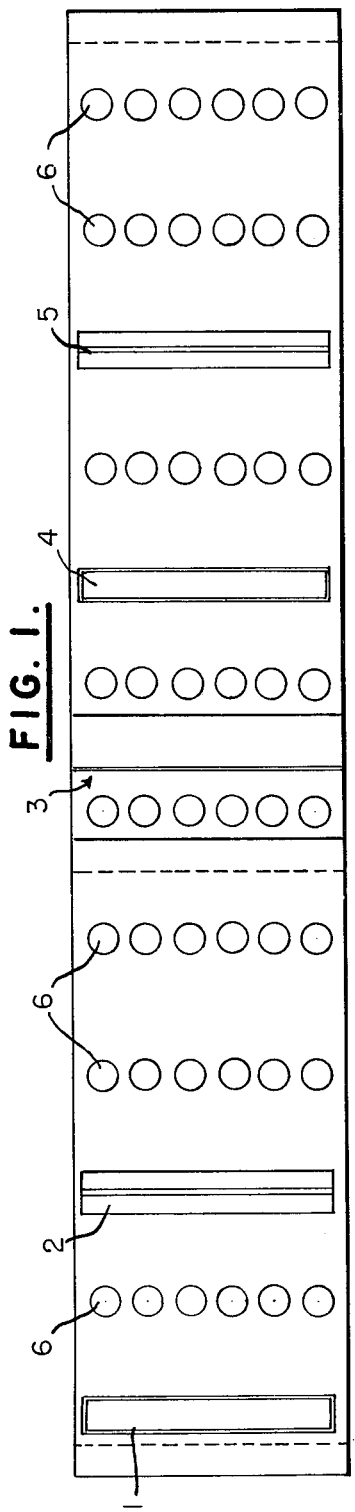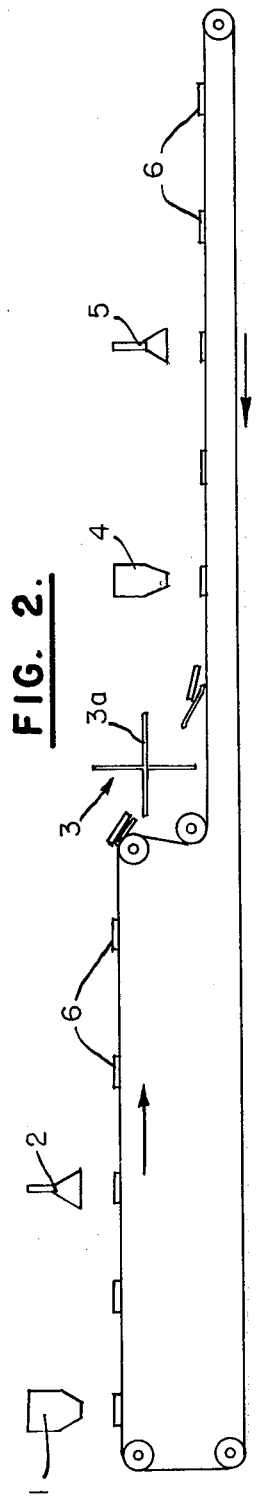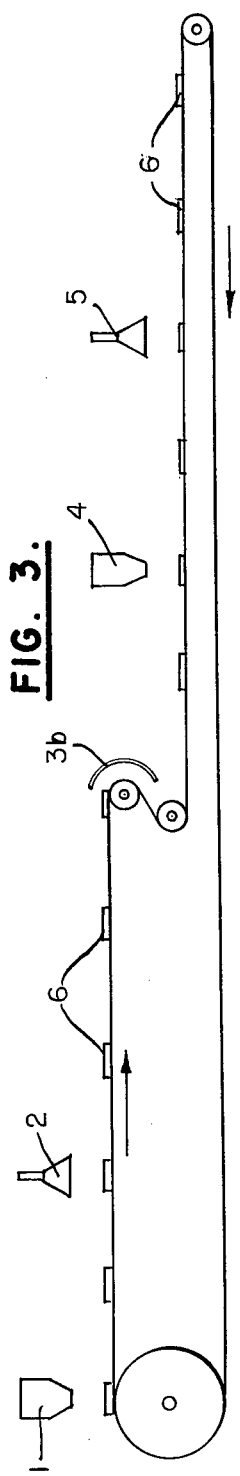

METHOD OF PROVIDING HAMBURGER PATTIES THAT DO NOT ADHERE TOGETHER WHILE PACKAGED AND THAT CAN BE EASILY SEPARATED

This application is a continuation-in-part of my copending Ser. No. 299,920, filed Oct. 24, 1972, and entitled "A Method to Provide Bacon Slices that do not Adhere Together while Packaged and Can be Easily Separated" and now abandoned. Application Ser. No. 299,920 discloses materials which can be employed according to the present invention.

OBJECT OF THE INVENTION

An object of the present invention is to apply a composition of matter consisting of food grade fat materials in powdered form to hamburger patty surfaces and provide patties that do not adhere together when they are refrigerated or when they are frozen.

Another object of the present invention is to apply a composition of matter consisting of food grade fat materials in powder form to hamburger patties to replace the paper that is used between the patties to prevent them from adhering together when refrigerated or when frozen.

Another object of the present invention is to apply a composition of matter consisting of food grade fat materials in powder form uniformly to hamburger patties that are to be quick frozen and packaged together without paper between each patty to prevent the hamburger patties from adhering when the patties thaw and are refrozen during storage or handling.

Another object of this present invention is to provide hamburger patties that when refrigerated or when frozen do not adhere together, by applying a composition of matter consisting of fat materials in powder form to hamburger patties surfaces after the patties have been formed and before being packaged in a new and novel manner employing a method and means that are economical to utilize and efficient to carry out.

This and other objects of this invention will become apparent from a reading of the following specifications and claims.

Importance of the sale of hamburger patties in portion controlled patty form to the economy of the United States is evidenced by growth in numbers of companies that exert major efforts in selling hamburgers at retail level here and in other countries. Further increase in sales will result when meat processors are able to market hamburger patties through grocery markets to consumers without fear that the patties are adhered together.

The resultant increase in production of these portion controlled hamburger patties has necessitated applying new approaches to the transportation, and storage requirements for the patties from their production to their use, for it is important that the patties do not adhere during this period.

Physical changes that occur to water and fat of the hamburger when in patty form, during varying temperatures encountered from preparation to end use during transportation and storage influence adherence between the patty contacting surfaces.

Companies that process meat products that reach the consumer through grocery markets are reluctant to offer unit packages of frozen hamburger patties because of their inability to prevent the patties from adhering from production to end use. Hamburger patties for commercial distribution as a portion food are formed in machines that mould from one to six or more patties per unit stroke. One production unit separates patties automatically by applying paper under each patty in an attempt to prevent adherence. Other procedures depend upon freezing of each patty individually before packaging them together, to prevent adherence.

In the procedure in which paper is employed the ground meat is placed in the hopper and self feeds. When the bottom pin plate moves forward the pins raise up like hay forks, grab the meat and work it ahead into the moulding area. As the pin plate moves back, the pins retract. The tumbler assembly keeps the meat from bridging. A reciprocal blade in front of the pin plate forces the chopped meat into the mould plate. When the mould plate moves forward, the fill slot is closed. A positive feed positions paper automatically under each patty. Patty moulding temperatures are above 30°F.

In a procedure that depends upon sharp freezing of patties to prevent adherence the ground meat for moulding is placed in an open hopper. The meat self feeds to individual pockets located over moulding cavities of horizontal reciprocating die plates when in filling position. Die plates then move to discharge position where products are then ejected onto a continuous moving belt directly to the freezer. Patties moulded in this operation are at temperatures below 30° F. During freezing for from 2.5 to 3.0 minutes at a temperature of −150° F produced by a gas at −325°F approximate, the patties temperature is reduced to about 0° F.

Patties separated with paper tend to adhere together as a result of moisture and fat that shifts to the paper when the patty contacts it, forming a loose union between the patty and the paper that when frozen becomes a firm bond.

Hamburger patties that are sharp frozen and packaged without paper between the patties must be maintained under constant freezing conditions during transportation, storage and handling until end use. During these periods hamburger patties are sometimes thawed, or increased to temperatures where they become soft. Patties will adhere under these conditions if refrozen or not.

By sharp freezing and maintaining patties frozen their flavor value is retained and bacterial growth is inhibited. Because of these derived benefits many processors of patties that apply paper between the patties are increasingly resorting to freezing to obtain these results.

To prevent hamburger patties that are packaged with or without paper between them from adhering when frozen or when refrigerated, a known amount of powdered fat material is applied to each side that contacts another patty when they are packaged, after moulding and prior to freezing or refrigerating.

The powdered fat uniformly coats over the patty surface and adheres to the fat and protein that are on the surface of the patty, providing a uniformly dry surface.

When the patty temperature rises to the thaw point and the patty is frozen again it will not adhere to the patty it is in contact with because the powder on both surfaces is impervious to temperature changes of the magnitude met by frozen or refrigerated hamburger patties.

FIG. 1 is a diagrammatical top view of apparatus employed to carry out the process of this invention.

FIG. 2 is a diagrammatical side view of apparatus for carrying out the process of this invention.

FIG. 3 is a diagrammatical side view of apparatus suitable for carrying out the process of this invention.

Figure 4:
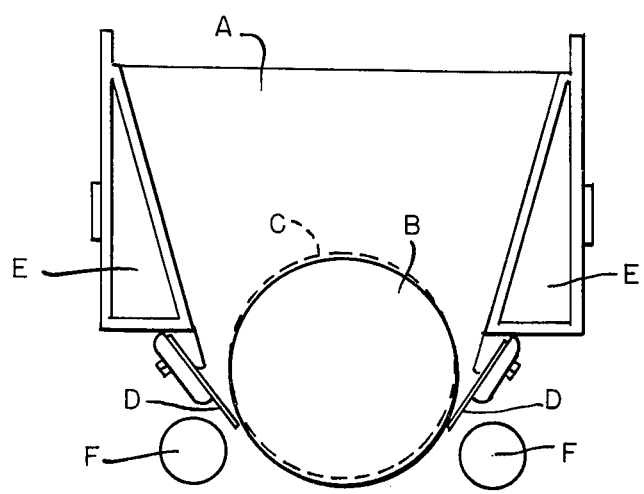
FIG. 4 is a diagrammatical view of an electrostatic depositing unit.

The present invention is directed to a method of preventing the adherence during freezing or during refrigeration of hamburger patties in contact with one another which comprises applying a coating of powdered stearine in an amount effective to prevent adherence during freezing or refrigeration to the contacting surfaces of the hamburger patties, said hamburger patties having a temperature of up to 38° F at the time of being coated.

The powder is applied to one side of the hamburger patty 6 at a time as it passes, moving on an open chain mesh conveyor belt at about 4 inches per second, through a film of the powdered fat falling from a trough in thin curtain form. The belt width can vary from 5 inches to about 30 inches or wider to accomodate from 1 to 6 or more patties in one line. Downward direction of the thin film of powder and uniformity of the rate of flow of the powder is provided by the electro static unit applicator that is used. In use the powdered fat is placed in the container metering hopper (A) of the electro static applicator unit shown in FIG. No. 4. From the hopper the powdered fat feeds to the horizontal metering roll (B) which drops the powdered fat in thin film effect. Uniformity of the amount of powder that is applied is controlled by the feed roll tension adjustment regulator (C) and metering roll wiper blade (D). Any air borne material is confined by the air curtain provided by (E). Electronic tubes induce an electronic field that provides direction control of the powder downward flow (F).

The applicator will vary in width to accomodate the number of patties to be coated in one line. While other means of depositing the powder may be used I prefer to use the electro static method since it is important to apply a uniform, known amount of the powder on each patty side that contact when packaged. After the powder has been applied to the top side surfaces of the hamburger (1) FIGS. No. 1, 2, 3, the patty moves on the conveyor about 8 inches, during an approximate time of 2 seconds. This allows the powder that will adhere to do so. The patty next passes under a suction fan (2) FIGS. No. 1, 2, 3, for about 1 second that removes the powder that will not adhere to the patty surfaces. The removed powder can be recovered and reapplied. The hamburger patty is then turned over (3) FIGS. No. 1, 2, 3, to the opposite side by one of the two methods shown. Other methods can be used.

The process of passing the patty through a curtain of powdered fat (4) and removing the excess that does not adhere to the patty second side by suction fan is carried out (5) FIGS. No. 1, 2, 3. Patties are either separated at this point with paper or are conveyed to the freezer.

FIG. No. 1 pictures patties in lines of six each and the units that are employed in the coating procedure. FIG. No. 2 shows a method of turning the patties to their other side after coating them on the first side. In this method the turner hand speed is synchronized with that of the conveyor or conveyors, and each turner flight picks up the patties and deposits them inverted for further treatment of coating and excess powder removal as in the first side process. 3a represents the hands of the turner. FIG. No. 3 pictures a method of inverting the patty that can also be used. In this procedure the levels of the belt and the deflector shield (3b) act to invert the patty.

The amount of powder that adheres to the hamburger patty and can not be removed by suction or by blowing is the amount that is required to prevent the hamburger patty from adhering when packaged together as patties and are frozen or when they are refrigerated. The amount of powder that adheres is a function of the patty temperature at the time the powdered fat is applied and the dimensions of the patty that is being coated. The powder pick up varies upward as the temperature of the patty increases and the dimensions increase.

While I prefer to deposit the powder on to hamburger patties by use of an electro static unit depositor the powder can be applied by other powder dispensers or by spraying it on.

The powder that does not adhere and is removed from the patty can be blown off and collected by suction or other means.

Data showing influence of temperature and diameter of hamburger patty on percent powdered fat adhered

| Patty Temperature*<br>° F | % Powdered Fat<br>Retained<br>Patty Dimensions<br>in Inches<br>4-5/32 | % Powdered Fat<br>Retained<br>Patty Dimensions<br>in Inches<br>4-19/32 |
| --- | --- | --- |
| 29 | 0.20 | 0.22 |
| 30 | 0.20 | 0.22 |
| 31 | 0.20 | 0.22 |
| 32 | 0.22 | 0.25 |
| 33 | 0.24 | 0.27 |
| 34 | 0.28 | 0.28 |
| 35 | 0.30 | 0.35 |
| 36 | 0.35 | 0.38 |
| 37 | 0.35 | 0.39 |
| 38 | 0.38 | 0.41 |

\* At time of moulding
\*\* Post removal of excess by suction fan

Influence of powdered fat applied to hamburger patties on their adherence during freezing and thaw periods, when the patties are separated with paper or frozen without paper.

| Adherence | Patties:<br>No. 1 | Patties:<br>No. 2 | Patties:<br>No. 3 | Patties:<br>No. 4 |
| --- | --- | --- | --- | --- |
| Status | | | | |
| After 96 hours at 0° F. | Perfect Release | Perfect Release | Adhered | Perfect Release |
| After thawing and refreezing in 2.5 minutes to 0° F. at 128 hrs. post freezing | 100% Adhered | Perfect Release | Adhered | Perfect Release |
| After thawing and refreezing in 2.5 minutes to | | Perfect Release | | Perfect Release |

-Continued

| Adherence | Patties: No. 1 | Patties: No. 2 | Patties: No. 3 | Patties: No. 4 |
|---|---|---|---|---|
| 0° F at 152 hrs. post freezing | | | | |
| After thawing and refreezing in 2.5 minutes to 0° F at 176 hrs. post freezing | | Perfect Release | | Perfect Release |

Patties No. 1: Moulded at 29° F. and frozen in 2.5 minutes to 0° F.
Patties No. 2: Moulded at 29° F. coated with 0.2% plus or minus powdered fat then frozen in 2.5 minutes to 0° F.
Patties No. 3: Moulded at 33° F, then frozen after separating with paper to 0° F. in 2.5 minutes.
Patties No. 4: Moulded at 33° F. and coated with 0.2% plus or minus and separated with paper, then frozen to 0° F. in 2.5 minutes Influence of powdered fat applied to hamburger patties on adherence during refrigerating and thawing periods, when the patties are separated with paper only and when coated and are not separated with paper.

| Adherence Status | Patties: No. 5 | Patties: No. 6 |
|---|---|---|
| After 96 hours at 30° F | Partly Adhered | Perfect Release |
| After temperature rise to 34 and return to 30° F. 128 hrs. post refrigerating | Adhered | Perfect Release |
| After thaw to 35° F and return to 30° F 132 hrs. post refrigerating | Adhered | Perfect Release |

Patties No. 5: Moulded at 33° F. and separated with paper and refrigerated at 30° F.
Patties No. 6: Moulded at 33° F. and coated with powdered fat and refrigerated at 30° F.

The present invention is applicable to an extensive range of uncooked foods including foods of animal origin, the invention is applicable to meats, e.g., beef, pork, mutton, etc. poultry, e.g., chicken, turkey, duck, etc., and sea food, e.g., cod, halibut etc. that will adhere together when refrigerated or when frozen.

Fats and oils intended for use in preparing powdered fat products to be applied to hamburger patties and other meat products may be made from animal, vegetable, or marine oils alone or any combinations of them. Any method that will provide a hardened oil or fat that will exist as a powder as powdered stearine may be used. The powder must exist as a powder at − 5° F, and also exist as a powder at a minimum of 90° F. 95 percent of the powder must pass through a 100 mesh screen at 95° F.

Having described my invention what I claim and desire to secure by letters patent is:

1. A method of preventing the adherence during freezing or during refrigeration of hamburger patties in contact with one another which comprises applying a coating of powdered stearine in an amount effective to prevent adherence during freezing or refrigeration to the contacting surfaces of the hamburger patties, said hamburger patties having a temperature of up to 38° F at the time of being coated.

2. The method of claim 1 wherein said powdered stearine exists as a powder at −5° F to at least 90° F; and wherein at least about 95 percent of said powdered stearine passes through a 100 mesh screen at 95° F.

3. The method of claim 1 wherein said powdered stearine is applied by spraying and which further comprises removing excess powder after applying said powdered stearine.

4. The method of claim 1 wherein the amount of powdered stearine is about 0.2 percent.

5. The method of claim 1 wherein said hamburger patties are packaged one on top of the other without having paper between the patties.

6. The method of claim 1 which comprises coating one said of each of the hamburger patties; then removing excess powder from said patties; then coating the other side of each of said patties; and then removing excess powder therefrom.

* * * * *